United States Patent Office
2,881,161
Patented Apr. 7, 1959

2,881,161

AMIDES OF ALGINIC ACID

Rudolf Köhler, Dusseldorf, and Wolfgang Dierichs, Dusseldorf-Holthausen, Germany, assignors to Henkel & Cie. G.m.b.H., Dusseldorf-Holthausen, Henkelstrasse, Germany, a corporation of Germany No Drawing. Application March 25, 1955
Serial No. 496,920

16 Claims. (Cl. 260—209.6)

This invention relates to amides of alginic acid.

Alginic acid and sodium alginate have found a wide variety of commercial uses, since their initial isolation from kelp in 1883. Their applications have depended upon their properties as emulsifying, suspending, jellying, thickening and bodying agents. These materials are competitive with the natural gums, such as gum arabic and gum tragacanth, in the preparation of many products which require thickening agents which produce large increases in viscosity with small increases of solids content, but are more consistently uniform than the natural gums since they are products of chemical manufacture.

The esterification of alginic acid is known and has been described, for example, by A. B. Steiner (Industrial and Engineering Chemistry, vol. 43, page 2073, 1951). We have found that esters of alginic acid can be reacted with ammonia, primary amines, secondary amines and carboxylic acid amides to produce amides of alginic acid. Further, we have found that the resulting amides of alginic acid are superior in properties to alginic acid and sodium alginate and are adapted for uses for which alginic acid and sodium alginate are unsuited, depending upon their exact chemical constitution. Also, we have found that the properties of the final amides can be varied by variations both in the esterification reaction and in the amidation reaction.

The chemical compounds in accordance with this invention are amides of alginic acid containing carboxylic acid amide groups having the general structural formula:

wherein $R_1$ and $R_2$ are hydrogen atoms or organic radicals and the carbon atom is coupled to the alginic acid chain. The organic radicals may be aliphatic, cyclo-aliphatic or aromatic hydrocarbon radicals. They may contain additional H—N or —NH$_2$ groups, as well as hydrophilic groups, such as, for example, hydroxyl groups, carboxyl groups or sulphonic acid groups. The length of the radicals $R_1$ and $R_2$ may vary within wide limits. However, compounds in which the total number of carbon atoms in the $R_1$ and $R_2$ groups is not more than twenty, are of the greatest interest.

These amides of alginic acid may contain only one carboxylic acid amide group or they may contain two or more different groups of this type. An amide of alginic acid which has been produced by a reaction in which complete amidation takes place may be represented by the following formula:

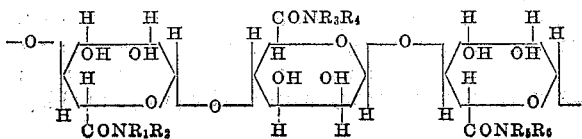

In this formula the $R_1$ to $R_6$ may represent, for example, any of the H—, CH$_3$—, C$_2$H$_5$—, C$_{12}$H$_{25}$—,
HOOC—CH$_2$—, HOOC—CH$_2$—HN—OC—CH$_2$—
or HOC$_2$H$_4$— radicals.

These alginic acid amides may contain both the carboxylic acid amide groups and ester groups derived from a lower monovalent aliphatic alcohol or a lower polyvalent aliphatic alcohol, and preferably containing from one to three carbon atoms. In addition to carboxylic acid amide groups and ester groups, the compounds may also contain free carboxylic acid groups. The amides which contain carboxy amide groups in which $R_1$ and $R_2$ are both hydrogen, resulting from an amidation reaction with ammonia as will be more fully explained hereinafter, may also contain carboxyl groups which are neutralized with ammonia, i.e. —COONH$_4$ groups, but the number of such groups is relatively small as compared with the number of the other types of groups which are present in the compound.

By the method in accordance with this invention, alginic acid is esterified and then reacted with an amide having the general structural formula:

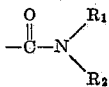

wherein $R_1$ and $R_2$ are hydrogen atoms or organic radicals. Thus, the compound which is reacted with an ester of alginic acid may be ammonia, a primary amine or a secondary amine, or a mixture of such compounds. The organic radical of the primary amine or the radicals of the secondary amine may be any of those mentioned hereinbefore as being the $R_1$ and $R_2$ or the $R_1$ to $R_6$ constituents of our new amides of alginic acid which are produced by this method.

In this method, alginic acid is first partially or entirely esterified to produce an ester of a lower monovalent aliphatic alcohol or of a lower polyvalent aliphatic alcohol. The alkyl group of this ester will preferably contain from one to three carbon atoms. In this esterification at least 40% of the carboxyl groups of the alginic acid are esterified and we prefer to esterify from about 40% to 100% of those groups. This partially or completely esterified alginic acid is then subjected to the amidation reaction in which at least a part of its ester groups are split to form acid amide groups with the release of alcohol.

The assumption that the ester bonds of the esters of alginic acid are actually split during the amidation reaction to form carboxyl amide groups with the release of alcohol, finds strong support in the fact that the theoretical amount of alcohol can be isolated from the reaction product formed by alginic acid esters and ammonia. This can be done most readily with those esters of alginic acid which contain the radical of a slightly volatile alcohol, such as, for example, ethylene glycol as the alcohol component. While this apparently proves our assumption that the ester bonds are split during the amidation reaction, we do not wish to be bound by this theory of the reaction if subsequent investigations show that the reaction proceeds in a different manner.

The ester of alginic acid which we react in the method of this invention may be produced from alginic acid of any desired degree of purity and the degree of polymerization may vary within wide limits. The alginic acids which have molecular weights of at least 30,000 and, preferably, within the range of about 30,000 to about 150,000, as determined by the viscosimetric method of Donnan and Rose (Canadian Journal of Research, volume 28B, pages 105–115, 1950), are particularly suitable for use in this method. Alginic acids having molecular weights within these limits and of various grades of purity are sold commercially in the form of their salts, However, this method is not limited to the reaction of alginic acids within this particular range of molecular weights.

In the first step of this method, we esterify alginic acid by reacting it with an alkylating agent, such as, for example, diazomethane or an alkylene oxide. The alkylene oxides are particularly suitable for this purpose and we have found that in actual practice ethylene oxide, propylene oxide and glycide have proven to be the most important. As already noted, this reaction is carried to the extent of esterifying at least 40% of the carboxyl groups of the alginic acid and preferably about 60% to 100% of those groups.

The control of the degree of esterification of the alginic acid in this step is important in determining the properties of our final product, since it determines the number of free carboxyl groups which remain in that product. We have found that the commonly used methods for the determination of the degree of esterification of non-macromolecular materials give values which are not suitable for the control of this reaction. It is believed that the reason for this is a degradation of the alginic acid molecule by the alkaline solutions under the saponification conditions required to determine their ester content. In any case, we have found that the following method for determining the degree of esterification of our esters of alginic acid is sufficiently accurate for our purposes.

To determine the degree of esterification by this method, we suspend one gram of the dried ester of alginic acid in fifty cubic centimeters of water in a volumetric flask having volume of one hundred cubic centimeters. Twenty-five cubic centimeters of a one-half normal solution of sodium hydroxide are then added to this suspension. Water is then added to the suspension to increase its total volume to one hundred cubic centimeters, the suspension thoroughly shaken and allowed to stand for one hour at room temperature. The solution is then titrated back to neutrality using phenolphthalein as an indicator and the degree of esterification of the original ester of alginic acid is calculated from the amount of sodium hydroxide which has reacted with it.

In the second step of our invention, in which the esters of alginic acid having the desired degree of esterification are subjected to amidation, the ester may be treated in a moist condition in which the ester contains, for example, about 50% by weight of water, although we prefer to have the moisture content below about 25%, by weight. The moisture content of the ester can be reduced to about 10% to about 5% by pressing, by drying at a temperature within the range of about 30° C. to about 70° C. or by a combination of such pressing and drying. Such dried esters are solid, fibrous products.

In general, we prefer to free the esters of alginic acid of substantially all moisture before subjecting them to the amidation reaction. This can be done, for example, by washing them with a volatile organic solvent for water, such as, for example, methyl alcohol, ethyl alcohol, propyl alcohol, acetone, methyl ethyl ketone or dioxane. The liquid content of an ester wet with such an organic solvent or moist with water can be determined by measuring its loss of weight upon drying at a temperature of about 70° C.

The amine, which is reacted with an ester of alginic acid by this method may be an aliphatic amine, such as, for example, methyl amine, ethyl amine, oxyethyl amine, propyl amine, oxypropyl amine, cyclohexyl amine, octyl amine, dodecyl amine or an amino sugar. It may be an aromatic amine, such as, for example, aniline, benzyl amine or naphthyl amine. It may also be an amine containing one or more acid groups, such as, for example, glycine, glycylglycine, anthranilic acid, sulfanilic acid, aminoethanesulfonic acid and the like. It may be an amino compound having two amino groups, such as, for example, ethylene diamine, hexamethylene diamine, phenylene diamine and urea.

To carry out the amidation reaction, the ester of alginic acid, in either a moist or dry condition, is admixed with a single amino compound or a mixture of such compounds, which is preferably kept in the liquid phase. The reaction will take place in an unagitated reaction mixture, although it is usually desirable to mix or agitate the reaction mixture during the entire reaction period. The reaction temperatures may vary within wide limits. At a temperature of −10° C. the reaction takes place very slowly. At a temperature of +50° C. or higher, side reactions and degradation of the alginic acid chain tend to interfere with the reaction. It is preferable to carry out the reaction at a temperature within the range of about 0° C. to about +40° C. The duration of the reaction may be from about 0.5 hour to about 50 hours, and in some particular cases may extend for periods of several days.

We have found that an average content of 0.3 carboxylic acid amide groups, per mannuronic acid unit of the alginic acid chain makes notable changes in the characteristics of the alginic acid, and we may use less than the stoichiometric equivalent of the amino compound in this amidation step of our method. We may, for example, use 0.5 molecule of the amino compound for each ester group in the alginic acid ester. However, it is usually desirable to use more than the stoichiometric equivalent of the amino compound, for example, from about 5 molecules to about 80 molecules of the amino compound per ester group.

For practical purposes, the amount of the amino compound used in the reaction can be measured on the basis of the weight of the esters of alginic acid to be reacted. For example, the amino compound may be used in an amount at least equal to one-half of the weight of the ester of alginic acid being reacted and it is often desirable to use an excess of the amino compound, which may for example, even exceed ten times the weight of the alginic acids being reacted.

In reacting the ester of alginic acid with a highly volatile amino compound, such as, for example, liquid ammonia, the pressure created in the reaction vessel will in most cases not exceed the vapor pressure of the volatile amino compound at the reaction temperature. Thus, for example, in the case of ammonia the pressure in the reaction vessel will not exceed about eight atmospheres at a reaction temperature of 20° C. The pressure may be lower when reacting an ester or alginic acid which is moist, for example, with water or with an organic solvent, so that it is possible to carry out its reaction at pressures below the vapor pressure of the volatile amino compound, down to substantially atmospheric pressure. Less volatile organic amino compounds are reacted in substantially the same manner, and as noted hereinbefore any desired mixture of amino compounds may be reacted with the ester of alginic acid.

We have found that it is particularly advantageous to carry out this amidation of the esters of alginic acid by reaction with an organic amino compound using liquid ammonia as a reaction medium. It is possible to carry out this reaction in a manner such that only the organic amino compound enters into the reaction. For this purpose the solution of the organic amino compound in the liquid ammonia should contain at least 5%, by weight, and preferably from about 10% to about 50% by weight, of the organic amino compound. However, these limits may be exceeded and the ratio of the organic amino compound to liquid ammonia adjusted anywhere between pure liquid ammonia and the pure organic amino compound, completely free from liquid ammonia. Depending upon the mixture ratio utilized, it is possible to obtain mixed alginic acid amides which contain both substituted and unsubstituted carboxylic acid amide groups resulting, respectively, from the reaction of the organic amino compound and of the ammonia with the ester of alginic acid.

As already noted, there is reason to believe that in the amidation reaction some of the ester groups of the ester of alginic acid may not react with the amino compound and, hence, carry over to the final product. The amidation reaction can be intentionally controlled to permit only partial amidation of the ester of alginic acid and thereby cause a significant proportion of the ester groups to carry over to the final product.

There is reason to believe that a small proportion of the free carboxyl groups of a partially esterified alginic acid is neutralized in an amidation reaction in which ammonia is present as the amino reactant or as a reaction medium, to produce an ammonium carboxylic salt group, as contrasted to a carboxylic acid amide group. In any case, the free carboxyl groups derived from a partially esterified alginic acid can be neutralized after the completion of the amidation reaction with cations. Gel-forming acid amides of alginic acid are produced by such reaction with cations which form water-soluble alginates.

The method in accordance with this invention and the new chemical compounds produced by this method are specifically illustrated by the following examples:

Example I

An admixture of 3 kilos of ethylene oxide and 695 grams of alginic acid, which had been washed with 80% alcohol with a 53% loss on drying, was allowed to stand for 96 hours in an autoclave having a net volume of 10 liters, at a temperature between 20° C. and 25° C. This treatment esterified approximately 75% of the carboxyl groups of the alginic acid, producing a partially esterified glycol ester of alginic acid. This ester was then washed with alcohol, and 40 grams of the moist product containing 90% by weight of the solid was admixed with 100 grams of anhydrous liquid ammonia in an autoclave and permitted to stand at a temperature between 18° and 25° C. for about 24 hours. A pressure of about 9 atmospheres developed in the autoclave. At the end of this amidation reaction the ammonia was evaporated, the product washed with 80% ethyl alcohol and then dried at a temperature of about 40° C. About 10 grams of ethylene glycol was recovered from the washed alcohol.

A total of 32 grams of the final reaction product was recovered and found to have a nitrogen content of about 5.6% by weight. It was found to swell in cold water to a very high degree and to dissolve readily in warm water. A solution of this reaction product in hot water forms a gel upon cooling.

Example II

Four kilos of liquid ethylene oxide were used to moisten 885 grams of a moist alginic acid containing 30% by weight of water in an autoclave having a net volume of 10 liters. This alginic acid had been prepared from an alginate solution by the addition of hydrochloric acid and still contained the small amount of hydrochloric acid which gave it a pH of 3.2. This mixture was allowed to stand for 96 hours at a temperature of between 20° and 25° C. The glycol ester of alginic acid produced by the reaction occurring during this period was insoluble in water. This ester was then subjected to amidation by admixing 62 grams of the ester containing 50% by weight of moisture with 150 grams of anhydrous ammonia under the same conditions of reaction shown in Example I.

A total of 28 grams of the reaction product was recovered and found to contain 7.5% by weight of nitrogen. It was soluble in warm water and its solution gelatinized upon cooling.

Example III

The procedure of Example I was duplicated with the exception that the time for the amidation reaction between the glycol ester of alginic acid and the liquid ammonia was decreased from the period of about 24 hours of Example I to a period of 2 hours. The final reaction product contained 6.0% nitrogen and formed softer gels, upon the cooling of a hot solution in water, than the product of Example I or that of Example II.

Example IV

A methyl ester of alginic acid having a methoxy content of 18.1% was produced by the reaction of alginic acid with a solution of diazomethane in ether by the process described by F. Micheel and E. Mille, "Zeitschrift für Physiologische Chemie," vol. 293, page 121, 1953. In view of the fact that the theoretical methoxy content of a fully esterified methyl ester of alginic acid is 16.3%, it must be assumed that the carboxyl groups of the alginic acid were fully esterified in this reaction and that, in addition, a small amount of etherification had taken place at the hydroxyl groups of the alginic acid.

Four grams of this methyl ester of alginic acid in the dry state were admixed with 8 grams of liquid ammonia in an autoclave and the mixture allowed to stand for 18 hours at a temperature of 20° C. After washing with 80% ethyl alcohol and drying at a temperature of 40° C., a product was obtained which swells in cold water, dissolves therein when the temperature of the water is raised, and forms a gel upon cooling the resulting solution to a temperature below 16° C.

Example V

A mixture of 260 grams of alginic acid containing about 53% by weight of water and 1 kilo of liquid ethylene oxide was allowed to stand in an autoclave having a net volume of 5 liters, for a period of 370 hours at a temperature of 0° C. The reaction under these conditions produced a glycol ester of alginic acid in which 90% of the original carboxyl groups are esterified. This ester is insoluble in water.

A mixture of 20 grams of this glycol ester of alginic acid and 60 grams of anhydrous ammonia was allowed to stand in an autoclave for 20 hours at room temperature. The product of this amidation reaction had a nitrogen content of 5.4% by weight. It swells in cool water and dissolves therein when the water is warmed. A solid, transparent gel is formed when the warm solution is cooled.

Example VI

Twenty grams of a glycol ester of alginic acid which was esterified to the extent of 75% of its carboxyl groups and which contained 21.7% by weight of volatile material was admixed with 200 grams of ethanolamine and the mixture allowed to stand in a closed flask for 30 hours at a temperature of 20° C. At the end of this period, the reaction mixture was a thick, mushy solution from which the product of the amidation of the glycol ester of alginic acid was precipitated by the addition of methanol. The precipitated reaction product was then repeatedly washed with 80% ethyl alcohol. This product was then dried at 60° C. to leave a fibrous, white product which had a nitrogen content of 6.55% by weight. This product dissolved in water to form a viscous solution which was stable even when potassium thiocyanate, calcium chloride, copper sulfate or acetic acid was dissolved therein.

Example VII

Fifty grams (0.25 mol) of a glycol ester of alginic acid which was esterified to the extent of 78% of its carboxyl groups and which contained 10.5% by weight of volatile material were moistened with a solution of 75 grams of glycine (1 mol) in 400 grams of liquid ammonia (23.5 mol) and the mixture allowed to stand in an autoclave for a period of 22 hours at a low temperature. The unreacted ammonia was then evaporated from the amidation reaction mixture and the product washed 6 successive times with 100 gram portions of liquid ammonia and, finally, with 80% ethyl alcohol to remove unreacted glycine. The product was then dried at 60° C.

The reaction product contained 8.93% by weight of nitrogen and the degree of reaction was 0.3 mol of the glycine per mannuronic acid group of the basic alginic acid polymer, as determined in terms of ammonium salt groups by the method of A. Ronchese, "Journal de Pharmacie et de Chimie," No. 6, vol. 25, page 611, 1907. This product dissolves in cold water to form a transparent, clear solution.

*Example VIII*

Ten grams (0.04 mol) of a glycol ester of alginic acid in which 75% of the carboxyl groups were esterified and which contained 10.5% by weight of volatile material were moistened with a solution of 25 grams (0.15 mol) of glycyl glycine hydrochloride in 200 grams of liquid ammonia and the mixture allowed to stand in an autoclave for 22 hours at a temperature of 20° C. The ammonia was then allowed to evaporate from the reaction mixture, and the unreacted glycyl glycine removed from the reaction product by boiling it in a 50% aqueous solution of ethyl alcohol. The reaction product was then dried. It was a solid fibrous material which will form a gel upon cooling a warm solution formed by dissolving as little as 0.3% by weight of the material in water.

*Example IX*

Thirty grams of a glycol ester of alginic acid which was 80% esterified and contained 21% by weight of volatile materials were admixed with 700 grams of dodecylamine in an open vessel and allowed to stand for 8 days at a temperature of 35° C. The reaction mixture was then intensively extracted with alcohol. The reaction product, left as a residue of the extraction, was a water-insoluble, pulverulent material which had the property of swelling in the presence of water-insoluble organic solvents, such as, for example, benzene, petroleum ether, and the like.

The nitrogen content of this product was 3.03% by weight. Since the theoretical value of the nitrogen content for a product obtained by the complete amidation of all ester groups of the glycol ester of alginic acid reacted here is 4.3% by weight, it appears that about 75% of the original ester groups had been split by the reaction to form carboxyl amide groups.

*Example X*

Fifty grams (0.25 mol) of a glycol ester of alginic acid which was 83% esterified and which contained 15.3% by weight of volatile material were admixed in an autoclave with a solution of 20 grams (0.33 mol) of ethylene diamine in 380 grams of liquid ammonia and the mixture allowed to stand for 20 hours at room temperature. The reaction mixture was then washed with 80% ethyl alcohol to yield, as a residue, a product which has a nitrogen content of 6.6% by weight. This product swells in water but is insoluble therein. This is believed to indicate that in this example the amidation reaction resulted in cross-linking between the basic polymeric chains of the alginic acid.

*Example XI*

Fifty grams (0.25 mol) of a glycol ester of alginic acid which was 75% esterified and which contained 11.1% volatile materials was mixed with a solution of 60 grams (1 mol) of urea dissolved in 400 grams of liquid ammonia in an autoclave and the mixture allowed to stand for a period of 22 hours at a temperature of 20° C. The reaction product was then recovered from the resulting reaction mixture by the procedure described in Example X. A solid, fibrous reaction product having a nitrogen content of 6.95% was isolated as a residue from the mixture. This product was only partially soluble in hot water to produce a solution which, upon cooling, solidifies to a cloudy gel.

The substitution of a methyl ester of alginic acid and of an ethyl ester of alginic acid having an esterification approximating the 75% esterification of the glycol ester of alginic acid used as a reactant in the foregoing reaction, resulted in products having very similar properties to that described in the foregoing. Thus, the methyl and ethyl esters of alginic acid are approximately equivalent to the glycol ester of alginic acid in the foregoing reaction.

As indicated by the foregoing examples, the unsubstituted alginic acid amides, in accordance with this invention, swell in cold water, but do not dissolve therein. They are soluble in hot water to produce solutions which, upon cooling, produce gels. The firmness of these gels depends upon the concentration of the alginic acid amide in the solution. The minimum concentration of the amide in a warm solution which will produce a gel upon cooling the solution is about 0.3% by weight, and is, therefore, lower than that for the gelatin now sold in commerce. Gels in which the concentration of the unsubstituted alginic acid amide derivatives is 2 to 3% by weight are more firm than gelatin gels having a similar concentration.

The melting point of the gels formed by the unsubstituted alginic acid amides can be varied within wide limits, and may be made considerably higher than the melting point of gelatin gels. The time required for the formation of the gel is relatively short, as compared with that required for the formation of a gelatin gel. Gelatin solutions, even at relatively high concentrations, require considerable periods of time for the formation of the gel, sometimes as much as several hours, whereas hot solutions of the unsubstituted alginic acid amides solidify very soon after cooling.

The gels of the unsubstituted alginic acid amides are relatively insensitive to temperature changes as compared with the gel-forming substances heretofore known. These gels can be melted by heating and re-gelled as often as desired. Upon cooling a re-melted gel, even one which has been heated to a temperature near its boiling point, the solution again solidifies to form a gel which has the same firm consistency as the original gel formed by cooling the initial solution.

Gels produced from the unsubstituted alginic acid amides, in contrast to those produced, for example, from agar agar, do not show syneresis. Unlike those formed from some gel-forming materials, they do not become cloudy upon standing. The addition of a third material is not necessary to bring about the formation of gel of an unsubstituted alginic acid amides solution. On the other hand, the presence of foreign materials does not interfere with the formation of the gel provided that they are inert with respect to the carboxylic acid amide groups of our new compounds. As illustrated by Example VI, this is true even in the case of ionizable electrolytes such as, for example, potassium thiocyanate calcium chloride, copper sulfate or acetic acid, which prevents gel formation with some other materials. This characteristic makes the unsubstituted alginic acid amides suitable for gelatinizing weakly acid aqueous liquids and weakly alkaline aqueous liquids.

Products in accordance with this invention which contain neutralized carboxyl groups and carboxyl amide groups also have gel-forming properties. Thus, a product formed by the partial esterification of alginic acid, followed by the amidation of its ester groups and then by the neutralization of its carboxyl groups with a cation which is capable of forming water-soluble alginates, such as, for example, sodium and potassium, has gel-forming properties. Again, a gel-forming product results from an incomplete amidation of an ester of alginic acid brought about, for example, by the reaction of the esters with liquid ammonia for only a short time.

The substituted alginic acid amides, depending upon their specific chemical constitutions, are capable of producing gels of highly viscous solutions which are resistant to decomposition in the presence of electrolytes and, thus, are similar in characteristics to the unsubstituted alginic acid amides. Again depending upon their specific chemical constitutions, they are suitable for use as dispersing and stabilizing agents, as protective colloids, and for many other purposes.

Substituted alginic acid amides produced by the use in our method of a monoamine compound as an amidation reagent, particularly one which contains a hydrophilic group or groups, such as, for example, the HO—, HOOC— or $HSO_3$ groups, are water-soluble and produce viscous solutions which in some cases have gel-forming properties. Amidation reagents containing radicals of high molecular weight, for example, radicals of six or more carbon atoms, which carry no hydrophilic groups, produce substituted alginic acid amides which are not soluble in water, but which are more or less soluble in organic solvents or at least capable of swelling in such solvents. Amidation reagents which contain two or more amino groups in their molecules, such as, for example, ethylene diamine or urea, produce substituted alginic acid amides which may be insoluble in water, but capable of swelling therein.

Mixed alginic acid amides in accordance with this invention, which contain both substituted and unsubstituted carboxyl amide groups in their molecular structure, have characteristics which lie between those of the corresponding alginic acid amides which contain, respectively, only unsubstituted carboxyl amide groups and only substituted carboxyl amide groups. Similarly, mixed alginic acid amides which contain two dissimilarly substituted carboxyl amide groups have characteristics intermediate between those of an alginic acid amide containing one of the substituted carboxyl amide groups and those of an alginic acid amide containing the other of the substituted carboxyl amide group of the mixed amide.

From the foregoing, it will be readily apparent to those skilled in the art that the characteristics of the products in accordance with this invention can be varied over a wide range to adapt the products for the particular use for which they are intended, and that with such adaptation they are superior to materials which have heretofore been available. For example, the water-soluble, gel-forming alginic acid amides in accordance with this invention have very material advantages in fields of application where gelatin, pectin, agar agar and carageen have heretofore been used for the formation of gels.

While we have given specific examples of our new products and certain examples of the practice of our method, it will be understood that these examples are for the purpose of illustration and that various modifications and changes can be made from the examples given without departing from the spirit of our invention or the scope of the following claims, and that while various theories have been given for the purpose of explaining the reactions, we do not intend to be bound by these theories.

The properties of the products prepared according to the process of the invention, are depending from the molecular size of the starting material, from the degree of substitution and from the kind of the radicals R. The degree of substitution may range between 0.3–1.0, preferably between 0.5–0.8 carbonamid groups per anhydromannuronic acid unit. The carbonic acid groups not being transformed into carbonamid groups, are preferably neutralized by the compound

used in the process. The amount of carbonamid groups may be determined by the method suggested by G. H. Joseph ("Food Technology," vol. 3, page 87, 1949).

We claim:
1. An amide of alginic acid containing a carboxylic acid amide group having the structural formula:

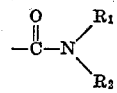

wherein $R_1$ and $R_2$ are each selected from the group consisting of hydrogen atoms and organic aliphatic radicals, said radicals containing only atoms selected from the group consisting of carbon and nitrogen atoms in the chain and said chain containing from 1 to 20 carbon atoms and the carbon atom is the carboxylic carbon of an alginic acid group and is coupled to an alginic acid chain.

2. A mixed amide of alginic acid containing at least two different carboxyl amide groups, each of which has the structural formula:

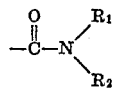

wherein $R_1$ and $R_2$ are each selected from the group consisting of hydrogen atoms and organic aliphatic radicals, said radicals containing only atoms selected from the group consisting of carbon and nitrogen atoms in the chain and said chain containing from 1 to 20 carbon atoms, and the carbon atom is the carboxylic carbon of an alginic acid group and is coupled to an alginic acid chain.

3. An amide of alginic acid containing an esterified carboxyl group and a carboxylic acid amide group having the structural formula:

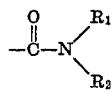

wherein $R_1$ and $R_2$ are each selected from the group consisting of hydrogen atoms and organic aliphatic radicals, said radicals containing only atoms selected from the group consisting of carbon and nitrogen atoms in the chain and said chain containing from 1 to 20 carbon atoms, and the carbon atom is the carboxylic carbon of an alginic acid group and is coupled to the alginic acid chain..

4. An amide of alginic acid containing a free carboxyl group and a carboxylic acid amide group having the structural formula:

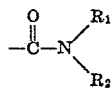

wherein $R_1$ and $R_2$ are each selected from the group consisting of hydrogen atoms and organic aliphatic radicals, said radicals containing only atoms selected from the group consisting of carbon and nitrogen atoms in the chain and said chain containing from 1 to 20 carbon atoms, and the carbon atom is the carboxylic carbon of an alginic acid group and is coupled to the alginic acid chain.

5. An amide of alginic acid containing a carboxylic salt group and a carboxylic acid amide group having the structural formula:

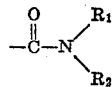

wherein $R_1$ and $R_2$ are each selected from the group consisting of hydrogen atoms and organic aliphatic radicals, said radicals containing only atoms selected from the group consisting of carbon and nitrogen atoms in the chain and said chain containing from 1 to 20 carbon atoms, and the carbon atom is the carboxylic carbon of an alginic acid group and is coupled to the alginic acid chain.

6. An amide of alginic acid containing a free carboxylic acid group, an esterfied carboxylic acid group, and a carboxylic acid amide group having the structural formula:

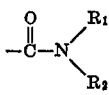

wherein $R_1$ and $R_2$ are each selected from the group consisting of hydrogen atoms and organic aliphatic radicals, said radicals containing only atoms selected from the group consisting of carbon and nitrogen atoms in the chain and said chain containing from 1 to 20 carbon atoms, and the carbon atom is the carboxylic carbon of an alginic acid group and is coupled to the alginic acid chain.

7. The amide of claim 6 wherein $R_1$ is the dodecyl radical and $R_2$ is hydrogen.

8. An unsubstituted amide of alginic acid containing a carboxylic acid amide group having the following structural formula:

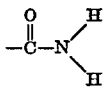

in which the carbon atom is the carboxylic carbon of an alginic acid group and is coupled to the alginic acid chain.

9. A mixed amide of alginic acid containing a carboxylic acid amide group having the following structural formula:

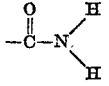

in which the carbon atom is the carboxylic carbon of an alginic acid group and is attached to the alginic acid chain and a carboxylic acid amide group having the following structural formula:

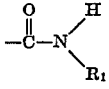

wherein $R_1$ is an organic aliphatic radical, said radical containing only atoms selected from the group consisting of carbon and nitrogen atoms in the chain and said chain containing from 1 to 20 carbon atoms, and the carbon atom is the carboxylic carbon of an alginic acid group and is attached to the alginic acid chain.

10. A mixed amide of alginic acid containing a carboxylic acid amide group having the following structural formula:

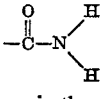

in which the carbon atom is the carboxylic carbon of an alginic acid group and is attached to the alginic acid chain and a carboxylic acid amide having the following structural formula:

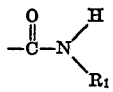

wherein $R_1$ is an organic aliphatic radical, said radical containing only atoms selected from the group consisting of carbon and nitrogen atoms in the chain and said chain containing from 1 to 20 carbon atoms and having attached thereto at least one hydrophilic group and the carbon atom is the carboxylic carbon of an alginic acid group and is coupled with the alginic acid chain.

11. The mixed amide of claim 10 wherein $R_1$ is the radical $-CH_2COOH$.

12. The mixed amide of claim 10 wherein $R_1$ is the radical $-CH_2CONHCH_2COOH$.

13. A mixed amide of alginic acid containing a carboxylic acid amide group having the following structural formula:

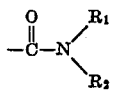

wherein $R_1$ is an organic aliphatic radical, said radical containing only atoms selected from the group consisting of carbon and nitrogen atoms in the chain, said chain containing from 1 to 20 carbon atoms, and having attached thereto at least one hydrophilic group, $R_2$ is hydrogen, and the carbon atom is the carboxylic carbon of an alginic acid group and is coupled with the alginic acid chain.

14. The mixed amide of claim 13 wherein $R_1$ is the radical $-CH_2CH_2OH$.

15. A gel comprising a solution of a watersoluble amide of alginic acid, containing an amount of the amide within the range of about 0.4% to about 10%, by weight.

16. A gel comprising a solution of a watersoluble, unsubstituted amide of alginic acid, containing an amount of the amide within the range of about 0.4% to about 10%, by weight.

References Cited in the file of this patent

UNITED STATES PATENTS

| | | |
|---|---|---|
| 2,463,824 | Steiner et al. | Mar. 8, 1949 |
| 2,494,912 | Steiner et al. | Jan. 17, 1950 |

OTHER REFERENCES

Karrer: "Organic Chemistry," distributed by Nordeman Publishers (N.Y.), 1938 (page 199 relied on).

Kertesz, Z. I.: "The Pectic Substances," published by Interscience Publishers, Inc. (N.Y.), 1951 (page 122 relied on).

Evtushenko, V. A.. (Central Algae Lab., All Union Sci. Inst., Fishing-Oceanog., Anchangel). "Kolloid Zhur." 16, 340–4 (1954), Colloid J. (U.S.S.R.) 16, 333–6. (Copy in Russian, available in U.S. Dept. of Agr. Library.) Abstracted in Chemical Abstracts, vol. 49, (1955), col. 14646.